United States Patent [19]

Kazo

[11] Patent Number: 6,091,510
[45] Date of Patent: Jul. 18, 2000

[54] JOURNAL DEVICE WHICH FACILITATES RETRIEVAL OF DATA PRINTED ON JOURNAL PAPER

[75] Inventor: Osamu Kazo, Tokyo, Japan

[73] Assignee: Nec Corporation, Tokyo, Japan

[21] Appl. No.: 08/928,339

[22] Filed: Sep. 12, 1997

[30] Foreign Application Priority Data

Sep. 12, 1996 [JP] Japan .................... 8-241983

[51] Int. Cl.⁷ .............. B41B 15/00; B41J 15/00; G06F 15/00
[52] U.S. Cl. ............ 358/1.18; 235/375; 705/23
[58] Field of Search ............ 705/24, 23; 235/379, 235/380, 375

[56] References Cited

U.S. PATENT DOCUMENTS 5,278,396  1/1994  McGaha .................. 235/432

FOREIGN PATENT DOCUMENTS

| | | |
|---|---|---|
| 59-23858 | 2/1984 | Japan . |
| 4-259096 | 9/1992 | Japan . |
| 6-162345 | 6/1994 | Japan . |
| 6-251255 | 9/1994 | Japan . |
| 6-309563 | 11/1994 | Japan . |
| 8-315251 | 11/1996 | Japan . |

OTHER PUBLICATIONS

Shigetaka, O., Merchandise Sale Data Processor, USPTO translation dated Mar., 1999, Sep. 9, 1994.

*Primary Examiner*—Amelia Au
*Assistant Examiner*—F. E. Cooperrider
*Attorney, Agent, or Firm*—Foley & Lardner

[57] ABSTRACT

A journal device including a printing unit for printing journal data on journal paper, as well as printing a retrieval mark indicative of information specifying the journal data, an operation unit for specifying jour data to be retrieved and designating information represented by a retrieval mark, a reading unit for reading a retrieval mark printed on journal paper to extract information represented by the retrieval mark, a printer control unit for receiving input of information extracted by the reading unit and collating the information with information designated by the operation unit to retrieve a retrieval mark containing target information, and first and second take-up means for running the journal paper with printing processing and retrieval processing of journal data and a retrieval mark.

7 Claims, 9 Drawing Sheets

JUNE 18,1996   12:00        No.0525            — A
  AAAA          780   1      780
  BBBB          520   1      520
  CCCC          730   2     1460
  DDDD          180   2      360
  EEEE          300   1      300
    SUBTOTAL              3 , 4 2 0YEN
  CONSUMPTION TAX          1 0 3 YEN
  ---------------------------------
    TOTAL                 3 , 5 2 3YEN
    RECEIVED              5 , 0 0 0YEN
    CHANGE                1 , 4 7 7YEN

[BARCODE]
9 6 0 6 1 8 1 2 0 0 0 5 2 5 0 3 0 1            — A

JUNE 18,1996   12:05        No.0526
  AAAA          880   1      880
  BBBB          480   1      480
  CCCC          280   1      280
```

141 — (receipt body)
142 — (barcode region)

FIG. 3

| 96 | 06 | 18 | 12 | 00 | 0525 | 03 | 01 |
|---|---|---|---|---|---|---|---|
| YEAR, | MONTH, | DAY, | HOUR, | MINUTE, | JOURNAL NO., | OPERATOR NO., | OPERATE CODE |

(DENOTATION)

JUNE 18,1996  12:00        No.0525

| AAAA | 780 | 1 | 780 |
| BBBB | 520 | 1 | 520 |
| CCCC | 730 | 2 | 1460 |
| DDDD | 180 | 2 | 360 |
| EEEE | 300 | 1 | 300 |

SUBTOTAL        3,420
CONSUMPTION TAX  103
----------------------------------
TOTAL           3,523
RECEIVED        5,000
CHANGE          1,477

— 161

◎■★○ — 162

JUNE 18,1996  12:05        No.0526

| AAAA | 880 | 1 | 880 |
| BBBB | 480 | 1 | 480 |
| CCCC | 280 | 1 | 280 |

JOURNAL DEVICE WHICH FACILITATES RETRIEVAL OF DATA PRINTED ON JOURNAL PAPER

BACKGROUND OF THE INVENTION

1. Field of the Invention

The present invention relates to a journal device which is to be connected for use with such product sales data processing devices as an ECR (Electronic Cash Register) and a POS (Point Of Sales) terminal to print data accompanying product sales on journal paper and, more particularly, to a journal device which facilitates retrieval of printed data.

2. Description of the Related Art

Journal devices are units which are to be connected for use with product sales data processing devices such as an ECR and a POS to print data (date of sale, product name, price, the number of products sold, etc.) accompanying product sales on journal paper and which mainly include a driving unit for taking up and running journal paper and a printing unit for printing data on the journal paper. Conventional journal devices in general have no function of retrieving journal data printed on journal paper. For retrieving journal data, therefore, journal paper taken up by a driving unit should be manually unrolled and forwarded to retrieve target data while checking data one by one.

However, a common journal paper is as long as 40 to 50 meters on which 500 to 800 data is recorded. Manual data retrieval therefore needs enormous labor and costs enormous time to find target data.

Figure 9:
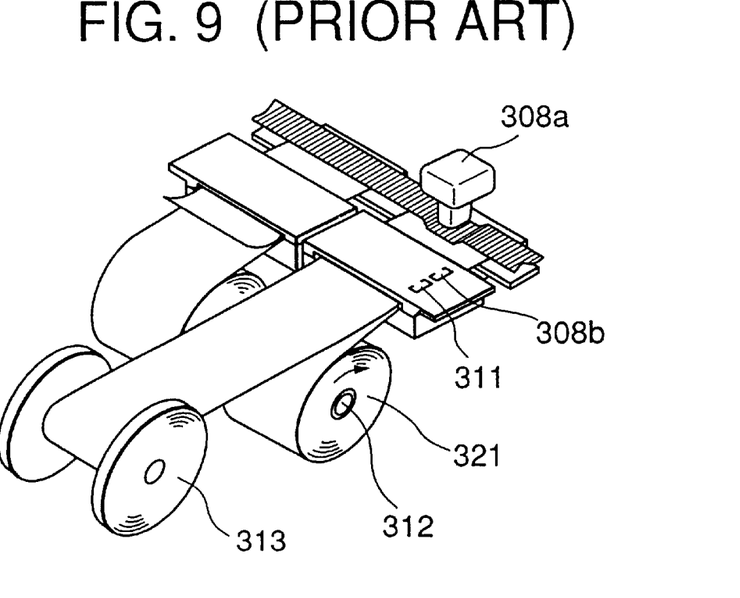
FIG. 9 is a perspective view of a main part of structure of a conventional journal device.
Figure 10A:
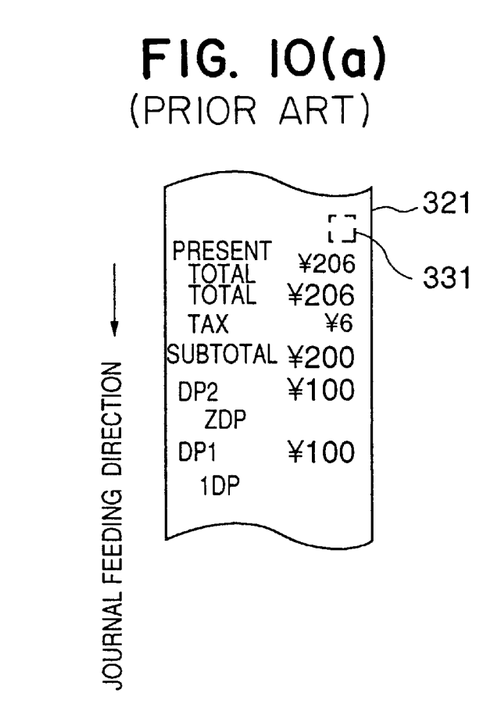
FIG. 10 is a diagram showing a conventional print example of journal data and a retrieval mark.
Figure 10B:
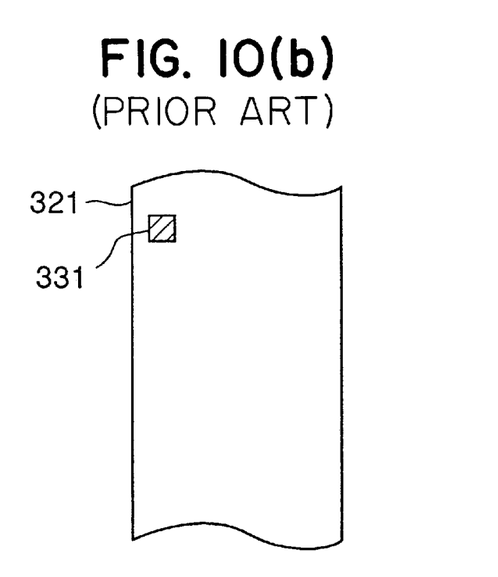

To reduce the above-described labor required for manually retrieving journal data and cut down a retrieval time, a journal device which automatically retrieves journal data is proposed in Japanese Patent Laying-Open (Kokai) No. Heisei 6-251255, entitled "Product Sales Data Processing Device". Structure of the journal device disclosed in this literature is shown in FIG. 9. A print example on a surface of journal paper on which data is printed by the journal device is shown in FIG. 10(*a*), while a print example on the reverse side of the journal paper is shown in FIG. 10(*b*).

With reference to FIG. 9, the conventional journal device recited in the literature includes a printing unit 308*a* for printing product data, a retrieval mark forming means 308*b* for printing a retrieval mark for use in retrieving journal data on journal paper, and a sensor 311 for use in the retrieval of journal data to detect a retrieval mark 331 attached to the journal paper by the retrieval mark forming means 308*b*.

Operation of thus structured conventional journal device will be described.

When sales data is transmitted from an ECR or a POS to the journal device, a driving means of the journal device takes up journal paper 321 to run the same. The printing unit 308*a* prints the transmitted sales data on a new area appearing on the journal paper 321 being taken up. Upon completion of the printing of the sales data, the retrieval mark forming means 308*b* prints the retrieval mark 331 at a position behind the printed sales data as shown in FIGS. 10 (*a*) and (*b*). Thereafter, as new sales data is printed, the journal paper on which sales data is printed further runs to be taken up by a take-up unit 313.

At the time of retrieval of journal data printed on the journal paper, the taken up journal paper 321 on which data is printed is set to a mounting unit 312, the tip of the journal paper 321 is rolled around the take-up unit 313 and a retrieval start instruction is transmitted from the ECR or the POS. Upon reception of the retrieval start instruction by the journal device, the journal paper 321 is taken up from the mounting unit 312 by the take-up unit 313 to run. At this time, the mark detecting sensor 311 monitors passage of a retrieval mark attached to the journal paper. Then, upon detection of the retrieval mark 331 by the mark detecting sensor 311, the journal device stops the running of the journal paper 321 to enter a data ascertainment state.

However, since a retrieval mark printed on journal paper by the above-described conventional journal device is of one kind, every time the mark detecting sensor detects the retrieval mark, the journal paper stops running to require ascertainment of the contents. Take-up of the journal paper and ascertainment of the contents therefore should be repeated until target data is found. In other words, while running and forwarding the journal paper is automatically conducted, checking data one by one is similarly conducted to the manual retrieval by the above-described journal device with no automatic retrieval function. As a result, it will take a long time to find target data.

In addition, since journal paper take-up direction is limited to one direction, retrieving data on journal paper in use needs the journal paper to be cut off in the middle of it and to be set again to a mounting unit and a take-up unit. This procedure requires much labor for retrieval.

A further disadvantage is that when journal paper is cut off in the middle of it, resetting the remaining part of the journal paper not printed to the mounting unit and the take-up unit results in generation of an useless part on the reset journal paper which will be taken up by the take-up unit without printing.

SUMMARY OF THE INVENTION

An object of the present invention is to provide a journal device capable of quickly retrieving target journal data among numerous journal data printed on journal paper.

Another object of the present invention, in addition to the above-described object, is to provide a journal device which is allowed to quickly shift from journal data recording processing to retrieval processing without resetting journal paper.

A further object of the present invention is to provide a journal device which automatically returns to a recording position of journal data recorded last after the retrieval of journal data to quickly shift from journal data retrieval processing to recording processing.

According to one aspect of the invention, the journal device for printing data accompanying product sales on journal paper, comprises printing means for printing journal data on the journal paper, as well as printing a retrieval mark indicative of information specifying the journal data, information designating means for specifying journal data to be retrieved among the journal data printed on the journal paper and designating information represented by the retrieval mark, information extracting means for reading the retrieval mark printed on the journal paper to extract information represented by the read retrieval mark, retrieval means for receiving input of information extracted by the information extracting means and collating the information with information designated by the information designating means to retrieve a retrieval mark containing target information, and journal paper running means for running the journal paper under the control of the retrieval means with the printing processing of the journal data and the retrieval mark by the printing means and the reading processing of the retrieval mark by the information extracting means.

The retrieval mark may be a bar code representing a sequence of numbers indicative of information specifying the journal data.

The retrieval mark may be a series of symbols in which specific symbols denoting the contents of the information are disposed at a position specified by each kind of information specifying the journal data.

In the preferred construction, after printing the journal data, the printing means prints the retrieval mark corresponding to the printed journal data below the printing position of the journal data.

In the preferred construction, before printing the journal data, the printing means prints the retrieval mark corresponding to journal data to be printed above the printing position of the journal data.

In another preferred construction, the journal paper running means includes two journal paper take-up means which drive individually, one of the take-up means taking up set the journal paper to run the journal paper in two directions, a direction from one take-up means to the other take-up means and its opposite direction, and when retrieving the journal data recorded on the journal paper in use, the retrieval means controls the journal paper running means to run the journal paper in the direction opposite to the running direction of the journal paper at the time of printing of the journal data.

In another preferred construction, when the device proceeds from the processing of retrieving the journal data to the printing processing, the retrieval means, by storing information represented by the retrieval mark corresponding to the journal data recorded last and collating information extracted by the information extracting means with the stored information, controls the journal paper running means to run the journal paper up to a recording position of the journal data recorded last.

In the above-mentioned construction, the journal paper running means includes two journal paper take-up means which drive individually, one of the take-up means taking up set the journal paper to run the journal paper in two directions, a direction from one take-up means to the other take-up means and its opposite direction, and when the device proceeds from the processing of retrieving the journal data to the printing processing, the retrieval means, by storing information represented by the retrieval mark corresponding to the journal data recorded last and collating information extracted by the information extracting means with the stored information, controls the journal paper running means to run the journal paper up to a recording position of the last recorded journal data.

In the preferred construction, the journal paper running means includes two journal paper take-up means which drive individually, one of the take-up means taking up set the journal paper to run the journal paper in two directions, a direction from one take-up means to the other take-up means and its opposite direction, and the retrieval means, when retrieving the journal data recorded on the journal paper in use, controls the journal paper running means to run the journal paper in the direction opposite to the running direction of the journal paper at the time of printing of the journal data, and when the device proceeds from the processing of retrieving the journal data to the printing processing, by storing information represented by the retrieval mark corresponding to the journal data recorded last and collating information extracted by the information extracting means with the stored information, controls the journal paper running means to run the journal paper up to a recording position of the journal data recorded last.

Also, the journal device may further comprise communication means to be connected with a host device which executes various processing accompanying product sales, wherein besides the information designating means, communication from the host device specifies journal data to be retrieved among the journal data printed on the journal paper and designates information represented by the retrieval mark.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
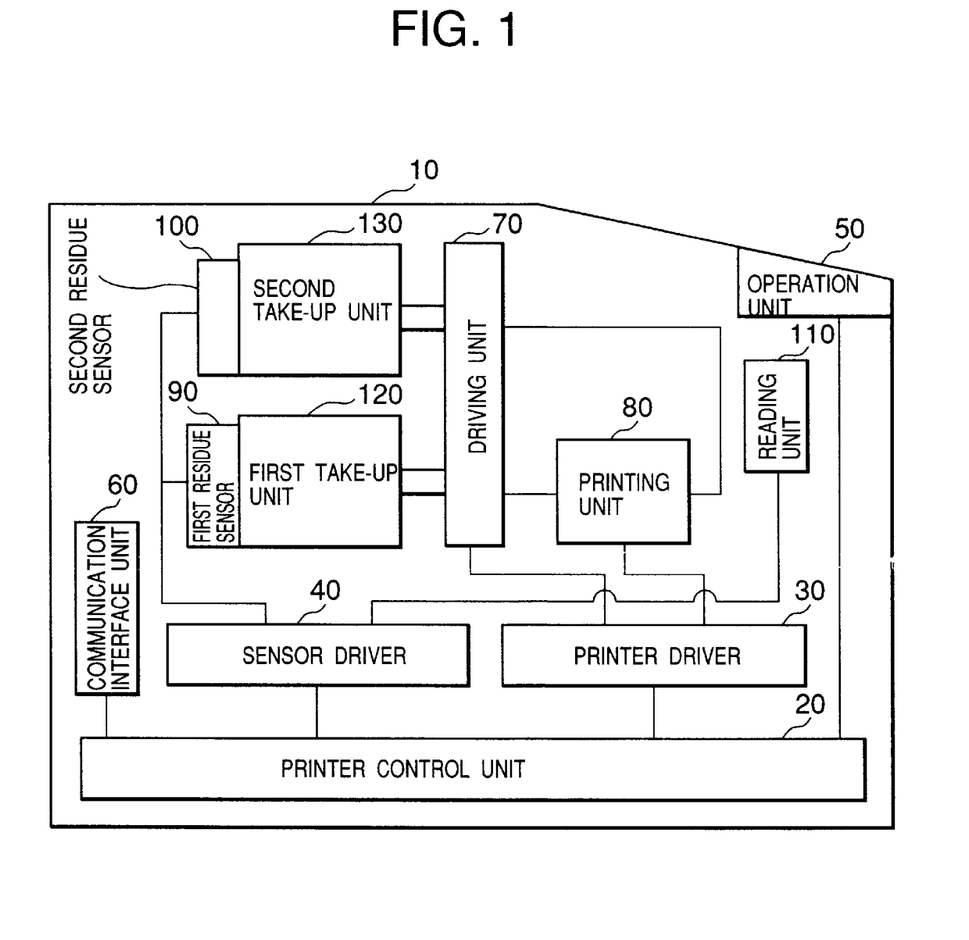
FIG. 1 is a block diagram showing structure of a journal device according to one embodiment of the present invention.
Figure 2:
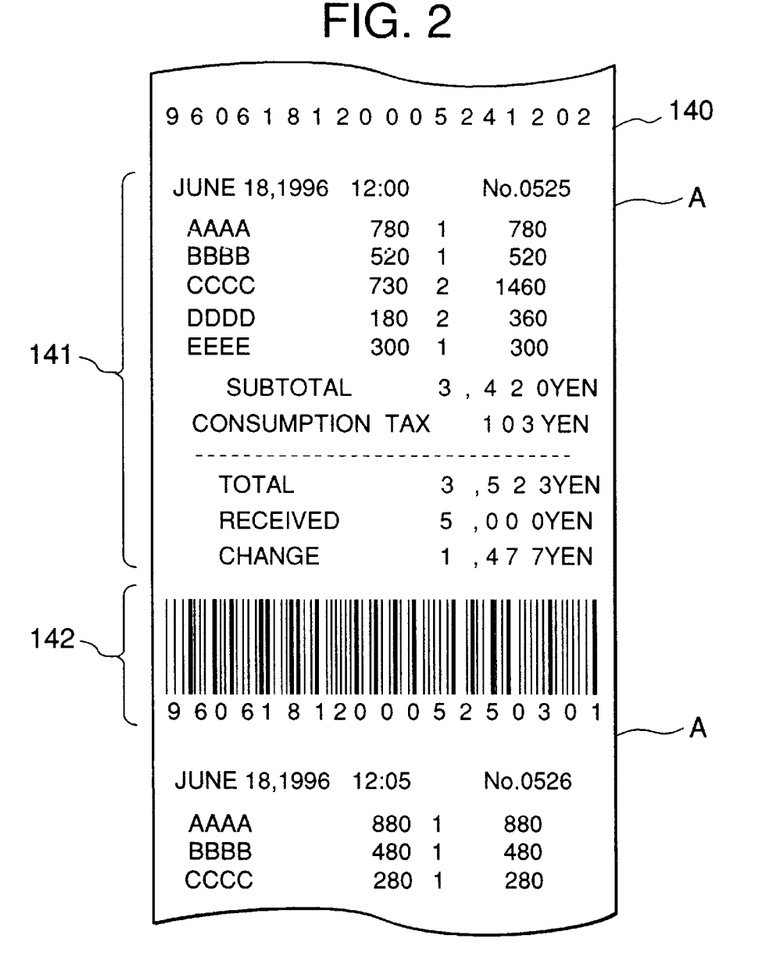
FIG. 2 is a diagram showing a print example of journal data and a retrieval mark according to the present embodiment.

FIG. 1 is a block diagram showing structure of a journal device according to the first embodiment of the present invention. FIG. 2 is a diagram showing one example of a print result obtained by a journal device 10 of the present embodiment.

As illustrated in the figure, the journal device 10 of the present embodiment includes a printer control unit 20 for controlling operation of each unit of the device, a printer driver 30 and a sensor driver 40, an operation unit 50 for receiving input of data and commands, a communication interface unit 60 to be connected with a host device such as an ECR or a POS, a driving unit 70 for taking up journal paper to run the same, a first take-up unit 120 and a second take-up unit 130, a printing unit 80 for printing journal data and a retrieval mark on journal paper, a first residue sensor 90 for retrieving a retrieval mark recorded on the journal paper, a second residue sensor 100 and a reading unit 110. In FIG. 1, illustration is made only of a characteristic part of the structure of the present embodiment and that of the remaining common part is omitted.

In the above-described structure, the printer control unit 20, which is implemented by a program-controlled CPU, controls the printer driver 30, the sensor driver 40, the operation unit 50 and the communication interface unit 60 to receive and transmit data and make necessary determination, thereby controlling the entire operation of the journal device 10.

The printer driver 30, which is implemented by a program-controlled CPU, controls operation of the driving unit 70, the printing unit 80, the first take-up unit 120 and the second take-up unit 130 under the control of the printer control unit 20.

The sensor driver 40, which is implemented by a program-controlled CPU, monitors the state of the first residue sensor 90 and the second residue sensor 100 to notify the printer control unit 20 under the control of the printer control unit 20, as well as controlling operation of the reading unit 110 and notifying the printer control unit 20 of data read by the reading unit 110.

The operation unit 50, which is implemented by an input device such as a keyboard, is provided with a key for setting a key word for use in retrieving journal data and for inputting instructions to start retrieval of a retrieval mark and take up journal paper.

The driving unit 70, which is controlled by the printer driver 30, is a mechanism unit for driving the first take-up unit 120 and the second take-up unit 130 to take up journal paper and has a driving system for controlling operation of the first take-up unit 120 and the second take-up unit 130. The first take-up unit 120 and the second take-up unit 130 each have a driving shaft to which a roll of journal paper is set and rotate under the control of the driving unit 70 to take up the journal paper. The roll of the journal paper is set to one of the driving shafts of the first take-up unit 120 and the second take-up unit 130 and taken up to the other side. Because both of the first take-up unit 120 and the second take-up unit 130 are structured to drive, the journal paper will run in both of the direction from the first take-up unit 120 to the second take-up unit 130 and the opposite direction from the second take-up unit 130 to the first take-up unit 120. In the following description, the former direction will be referred to as a forward direction and the latter direction will be referred to as a backward direction. For example, when the journal paper roll set to the first take-up unit 120 is taken up by the second take-up unit 130 at ordinary journal data printing, the journal paper running direction will be a forward direction. That for retrieving journal data already recorded on the journal paper will be a backward direction.

The printing unit 80, which is controlled by the printer driver 30, is a mechanism unit for printing journal data sent from a host device and the retrieval mark 142 for use in retrieving journal data on the journal paper.

The first residue sensor 90 is a sensor provided at the first take-up unit 120 to monitor residue of the journal paper set to or taken up by the first take-up unit 120. The second residue sensor 100 is a sensor provided at the second take-up unit 130 to monitor residue of the journal paper set to or taken up by the second take-up unit 130. The first residue sensor 90 and the second residue sensor 100, which can be implemented by a photo sensor or a mechanical sensor, for example, notify the sensor driver 40 according to the residue of the journal paper.

The reading unit 11, which is implemented by a photo sensor, for example, monitors the journal paper run by its take-up by the first or the second take-up unit 120 or 130 and reads the printed retrieval mark 142 to transmit contents data of the retrieval mark 142 to the sensor driver 40.

With reference to the print result shown in FIG. 2, an area A—A in journal paper 140 represents data recorded corresponding to one transaction. As shown in the figure, recorded in the area A—A are the journal data 141 and the retrieval mark 142. The journal data 141 is the same as the journal data recorded at a conventional journal device. Recorded as the journal data are date of transaction, the receipt number, specifications of transaction, the amount of transaction, etc.

The retrieval mark 142, which is a mark to be a retrieval object at the retrieval of the journal data 141, is recorded below the corresponding journal data 141 as illustrated in the figure and includes information regarding the corresponding journal data 141 such as recorded date, the journal number, the operator number and an operate code. These data are used as key data for retrieval.

Figure 3:
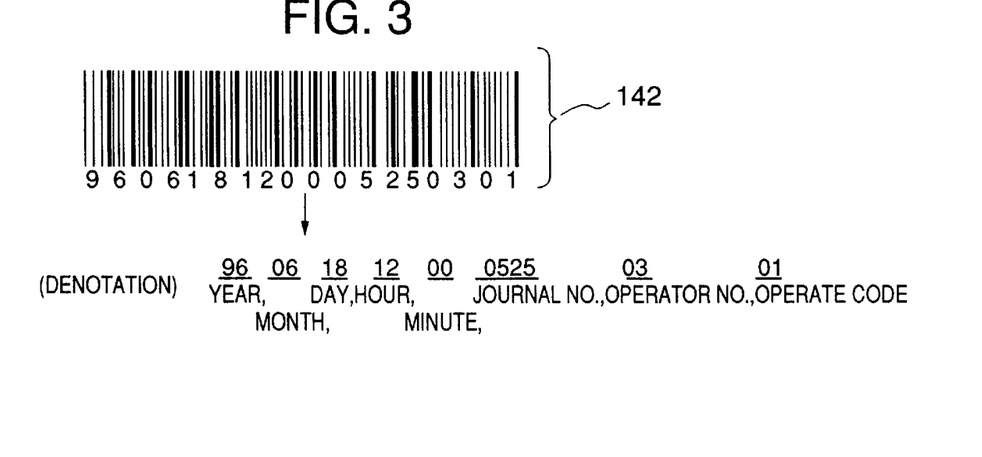
FIG. 3 is a diagram showing one example of a retrieval mark.

FIG. 3 is a diagram showing an example of a bar code used as the retrieval mark 142. The retrieval mark 142 shown in FIG. 3 represents information, which is to be denoted by the retrieval mark, by a sequence of numbers, which sequence is denoted as a bar code. The operator number is for specifying a person in charge of the transaction. The operate code represents the contents of the transaction. Fixed code numbers are recorded according to the contents of transaction such as "01" for settlement of account in cash, "02" for settlement by a credit card, "03" for settlement by a prepaid card, "04" for settlement by a gift certificate and "05" for money exchange.

Next, operation of the present embodiment will be described with reference to flow charts shown in FIG. 4 and FIGS. 5A and 5B.

Figure 4:
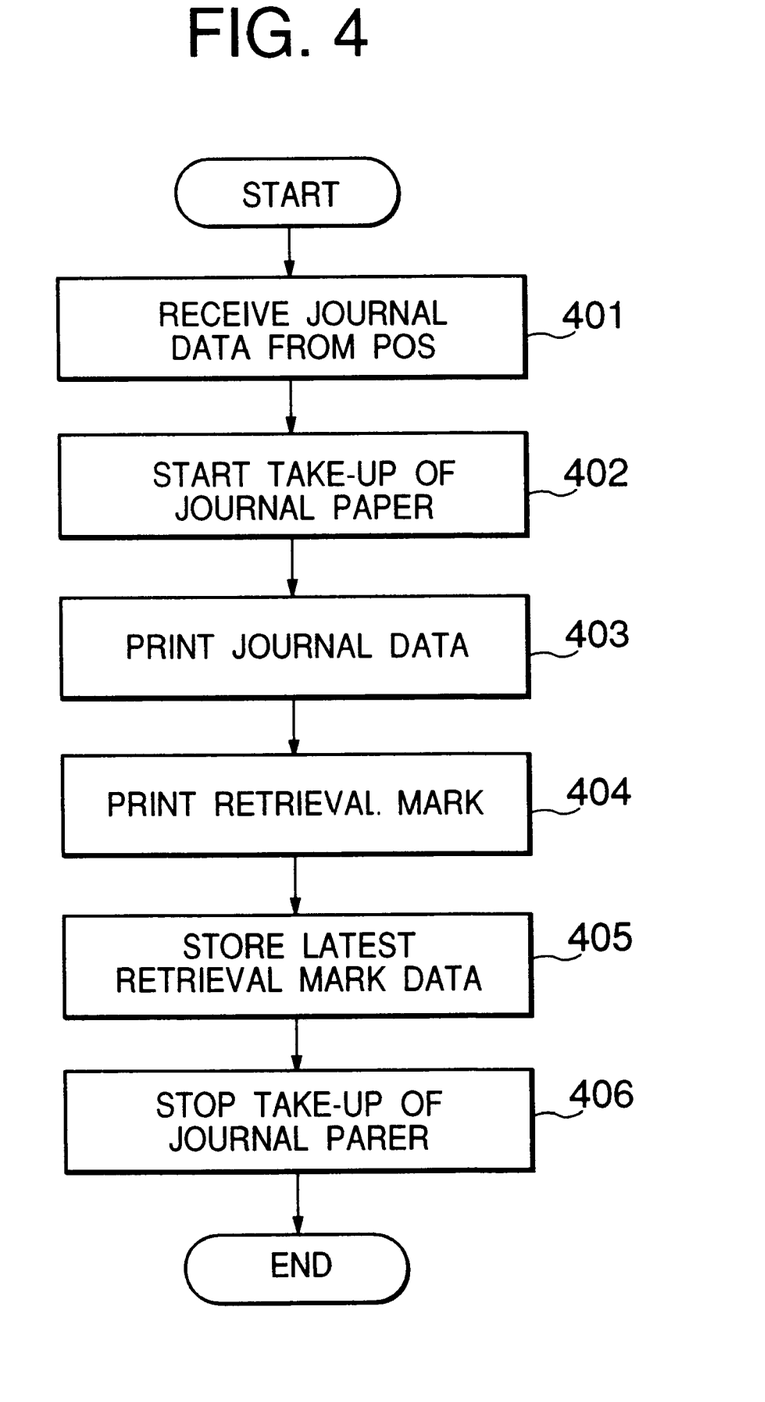
FIG. 4 is a flow chart showing operation of journal data printing processing according to the present embodiment.

FIG. 4 is a flow chart showing operation of the journal device of the present embodiment for printing journal data on journal paper. With reference to FIG. 4, first, the journal data 141 and data for use in generating the retrieval mark 142 are transmitted from an ECR or a POS as a host device and the journal device 10 receives the data via the communication interface unit 60 (Step 401).

The journal device 10 which has received the journal data 141 and the data for generating the retrieval mark 142 gives an instruction to start take-up of the journal paper 140 and printing from the printer control unit 20 to the printer driver 30 (Step 402). The printer driver 30 operates the driving unit 70 and the second take-up unit 130 to take up the journal paper 140 from the first take-up unit 120 to the second take-up unit 130 and run the paper in the forward direction.

The printer driver 30 sends the printing start instruction, the journal data 141 to be printed and the data for generating the retrieval mark 142 to the printing unit 80. Then, the printing unit 80 prints the journal data 141 on the journal paper 140 (Step 403) and subsequently prints the retrieval mark 142 based on the data for generating the retrieval mark 142 (Step 404).

After the completion of the printing of the retrieval mark 142, the data related to the printed retrieval mark 142 is stored in a storage means (e.g. internal memory) of the printer control unit 20 (Step 405) to stop take-up of the journal paper 140 (Step 406). The data in the storage unit is overwritten and erased every time new data is stored.

Figure 5A:
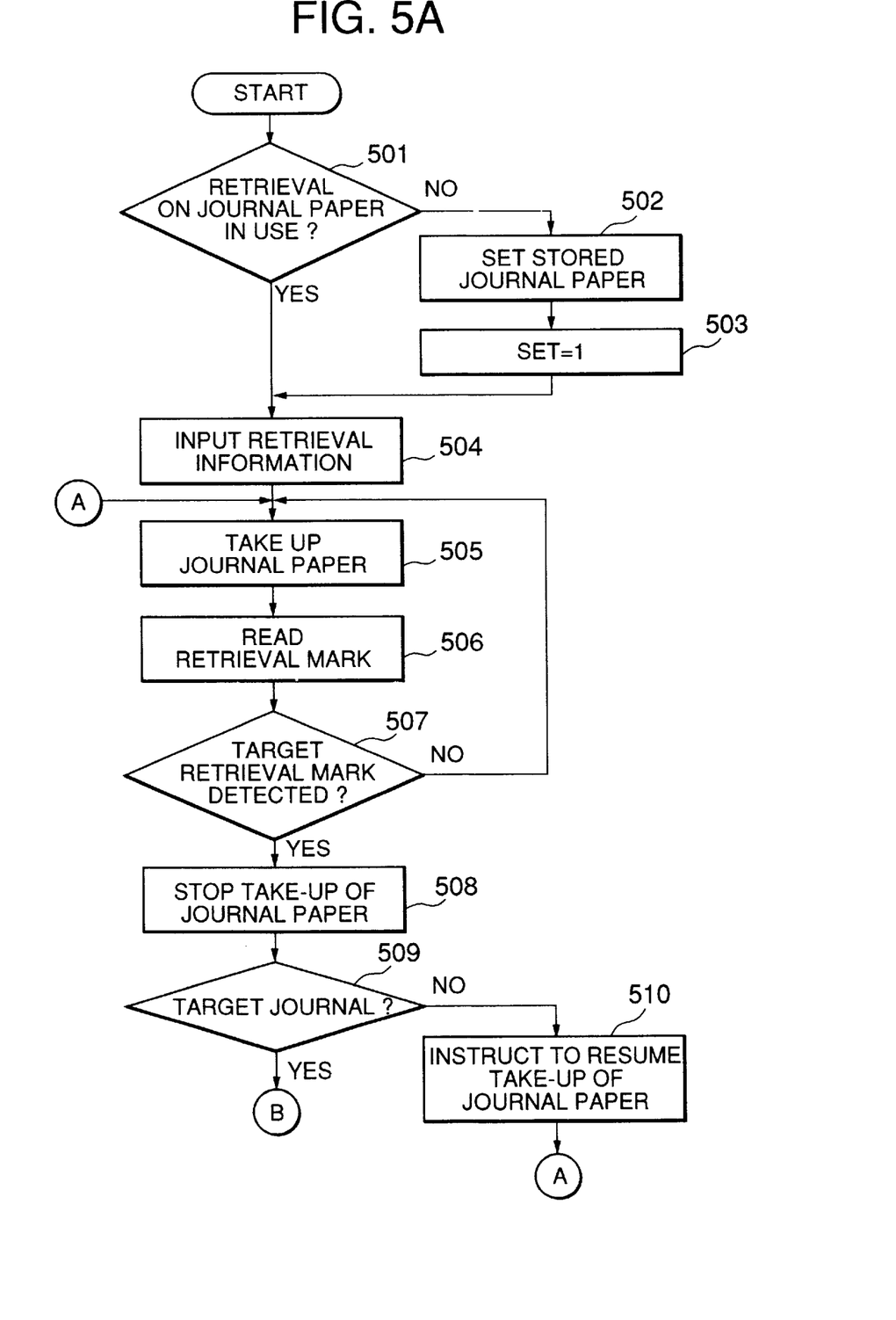
FIG. 5A is a flow chart showing operation of journal data retrieval processing according to the present embodiment.
Figure 5B:
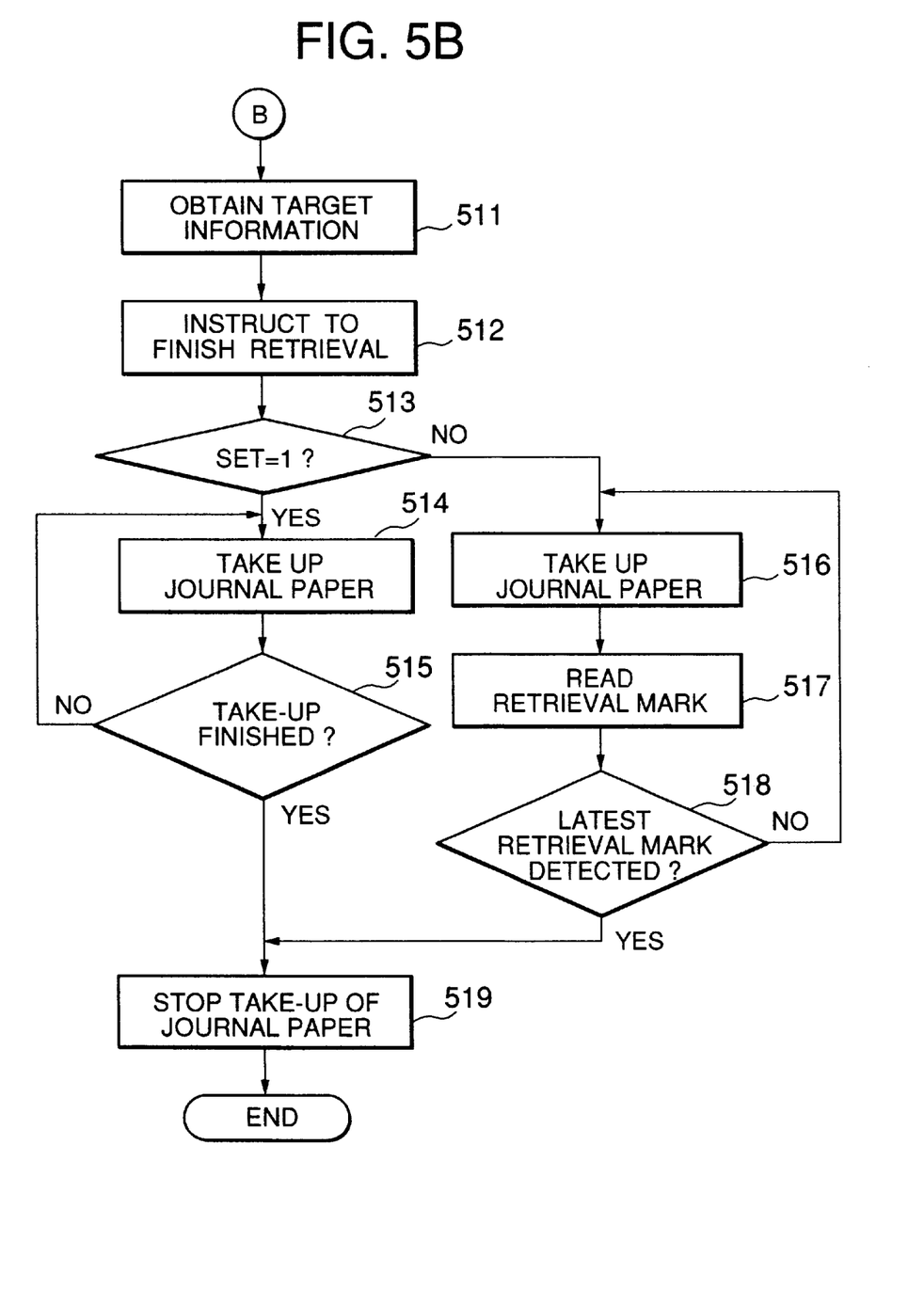
FIG. 5B is a flow chart showing operation of journal data retrieval processing according to the present embodiment.

FIGS. 5A and 5B are flow charts showing operation of retrieving journal data already recorded on journal paper. Initially at the execution of the operation, the journal device 10 is switched to a journal data retrieving mode by the instruction from a host device or by the operation of the operation unit 50 of the journal device 10. Thereafter, with reference to FIG. 5, first, selection is made whether the journal data 141 as a retrieval object is to be retrieved from the journal paper 140 in use, that is, the journal paper 140 set to the first or the second take-up unit 120 or 130, or from the stored journal paper 140 whose entire storage area has already recorded the journal data 141 (Step 501). When the journal data 141 is to be retrieved from the journal paper 140 in use, a retrieval key word is subsequently input in response to an instruction from the host device or by the operation of the operation unit 50 (Step 504).

On the other hand, when the journal data 141 is to be retrieved from the stored journal paper 140, the journal paper 140 in use is first taken out from the first and the second take-up units 120 and 130. Then, the journal paper 140 on which the journal data 141 is to be retrieved is set to the second take-up unit 130 and the tip of the journal paper is rolled around the first take-up unit 120 (Step 502). Consequently, when the second residue sensor 100 recognizes the existence of the journal paper and the first residue sensor 90 recognizes non-existence of journal paper, a SET parameter is set to "1 (initial value)" (Step 503). This SET parameter enables distinction between retrieval of the journal data 141 from the stored journal paper 140 and retrieval of the journal data 141 from the journal paper 140 in use. After thus setting the journal paper 140, a retrieval key word is input in response to an instruction from the host device or by the operation of the operation unit 50 (Step 504).

Key words can be arbitrarily selected and set among date, time, the journal number, the operator number and an operate code which are information items recorded in the retrieval mark 142. With "date" set as a key word, for example, the journal data 141 recorded on that date can be retrieved, while with "operate code" set as a key word, the journal data 141 having transaction contents denoted by that operate code can be retrieved. A plurality of key words may be set such as "date, operator number, operate code". Setting key words of all the items enables detection of target journal data 141 in one retrieval.

Upon input of a retrieval key word, the first take-up unit 120 drives by the control of the driving unit 70, so that the journal paper 140 runs in the backward direction from the second take-up unit 130 to the first take-up unit 120 (Step 505). Then, the reading unit 11 reads data of the retrieval mark 142 which passes through as the journal paper 140 runs (Step 506).

The data contained in the retrieval mark 142 read by the reading unit 110 is sent to the printer control unit 20 via the sensor driver 40 and collated with the retrieval key word input in advance at the printer control unit 20 (Step 507). As a result of the collation, when none of the data of the read retrieval mark 142 contains the key word input in advance, take-up of the journal paper 140 and reading of the retrieval mark 142 will be continued.

On the other hand, as a result of the collation, when the read data contains the key word, take-up of the journal paper 140 is stopped (Step 508) and the user ascertains the journal data 141 printed on the journal paper 140 (Step 509). As a result of the ascertainment, if the journal data 141 is not target data, take-up of the journal paper 140 and reading of the retrieval mark 142 will be resumed by the operation of the operation unit 50 or in response to an instruction from the host device (Step 510).

As a result of the ascertainment by the user, if the journal data 141 is target data, desired information is obtained from the journal data 141 (Step 511). Then, the operation unit 50 or the host device gives instructions to finish retrieval (Step 512).

The printer control unit 20 of the journal device 10 which has received the retrieval finishing instruction ascertains the value of the SET parameter set at the start of the retrieval (Step 513). When the value of the SET parameter is "1" which indicates retrieval from the stored journal paper 140, take-up of the journal paper 140 is started in the direction from the first take-up unit 120 to the second take-up unit 130, opposite to the running direction at the time of the retrieval (Step 514). Then, when the first residue sensor 90 senses the journal paper 140 rolled around the first take-up unit 120 being completely taken up, takeup of the journal paper 141 is stopped (Steps 515 and 519). Thereafter, the user takes out the journal paper 140 taken up by the second take-up unit 130 from the journal device 10 and stores the paper.

On the other hand, when the value of the SET parameter ascertained in response to the retrieval finishing instruction indicates retrieval from the journal paper 140 in use, take-up of the journal paper 140 is started in the direction from the first take-up unit 120 to the second take-up unit 130, opposite to the running direction at the time of the retrieval (Step 516). As the journal paper 140 runs, the reading unit 110 reads the retrieval mark 142 and sends data indicated by the read retrieval mark 142 to the printer control unit 20 via the sensor driver 40 (Step 517). The printer control unit 20 collates the received read data with the data of the retrieval mark 142 stored at the time of recording of the journal data 141 (see FIG. 4, Step 405). Then, until the read data coincides with the stored data, data of the retrieval marks 142 read one after another by the reading unit 110 are sequentially collated with the stored data, and when they coincide with each other, take-up of the journal paper 140 is stopped at the position in question, that is, the position where the latest journal data 141 is recorded (Steps 518, 519). Thereafter, new journal data 141 will be recorded after the journal data 141 in question.

As described in the foregoing, the journal device 10 of the present embodiment is structured such that at the time of recording of the journal data 141 on the journal paper 140, the retrieval mark 142 for use in the retrieval of the journal data 141 in question is at the same time recorded, and at the time of retrieval of the journal data 141, key data to be specified by the retrieval mark 142 is designated to read the retrieval mark 142 while automatically taking up the journal paper 140, and upon detection of the retrieval mark 142 containing the specified key data, the running of the journal paper 140 is stopped, whereby the journal paper 140 never stop at other place than target journal data 141 to enable efficient retrieval of target data.

In addition, provision of two take-up units 120 and 130 having driving means allows the journal paper 140 to run by its take-up in two directions, forward and backward directions. This facilitates retrieval of the journal data 141 recorded on the journal paper 140 being used. It is also possible to return the journal paper 140 to the position of journal data 141 recorded last after desired retrieval and accordingly possible to record the subsequent journal data 141 thereafter, which enables efficient use of the journal paper 141.

Figure 6:
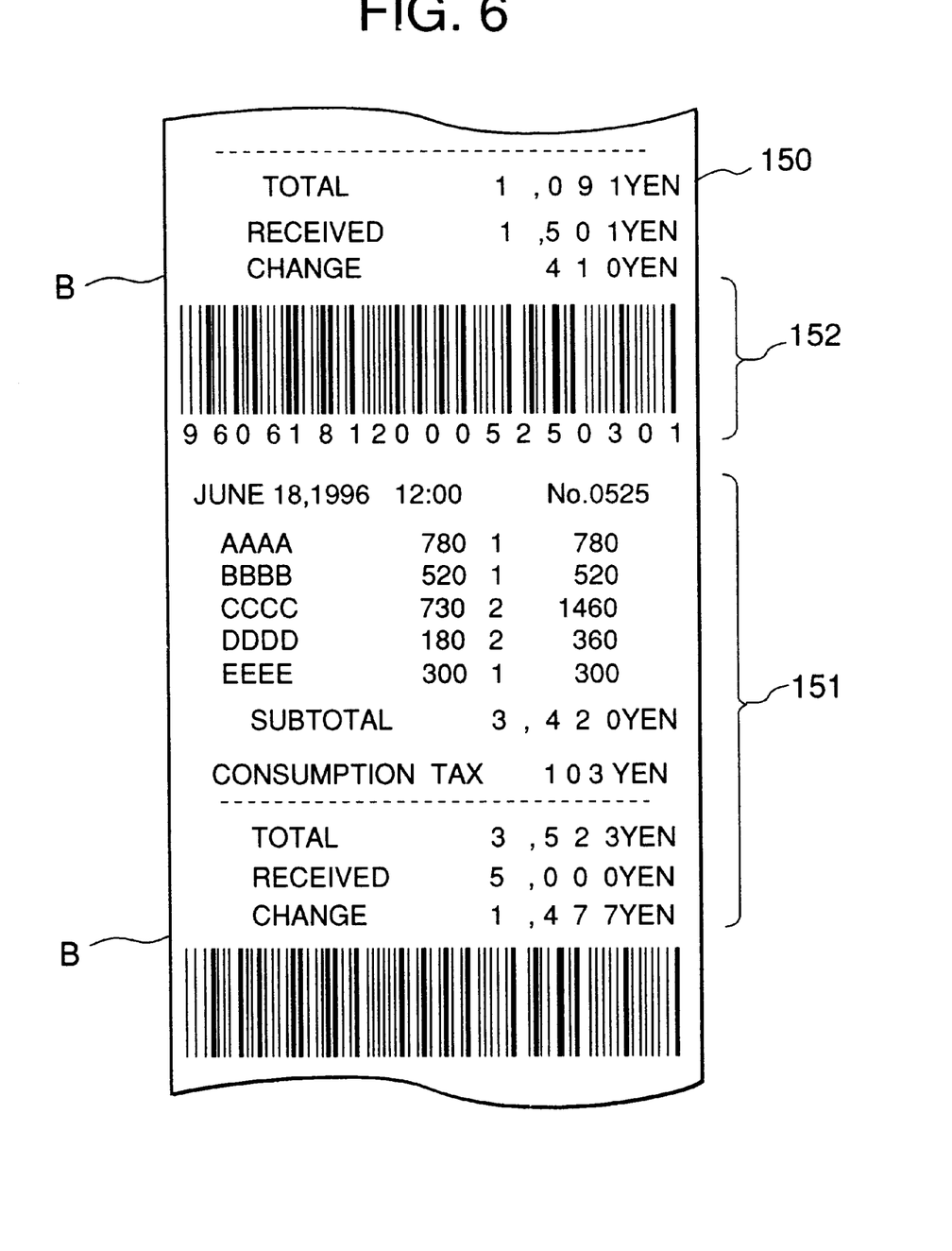
FIG. 6 is a diagram showing another print example of journal data and a retrieval mark according to the present embodiment.

FIG. 6 is a diagram showing another example of a print result obtained by the journal device 10 of the present embodiment.

With reference to the print result of FIG. 6, an area B—B on journal paper 150 represents data recorded corresponding to one transaction. As shown in the figure, the area B-B has a retrieval mark 152 printed above journal data 151. The contents of the journal data 151 and the retrieval mark 152 are the same as those of the journal data 141 and the retrieval mark 142 as the print result shown in FIG. 2.

Figure 7:
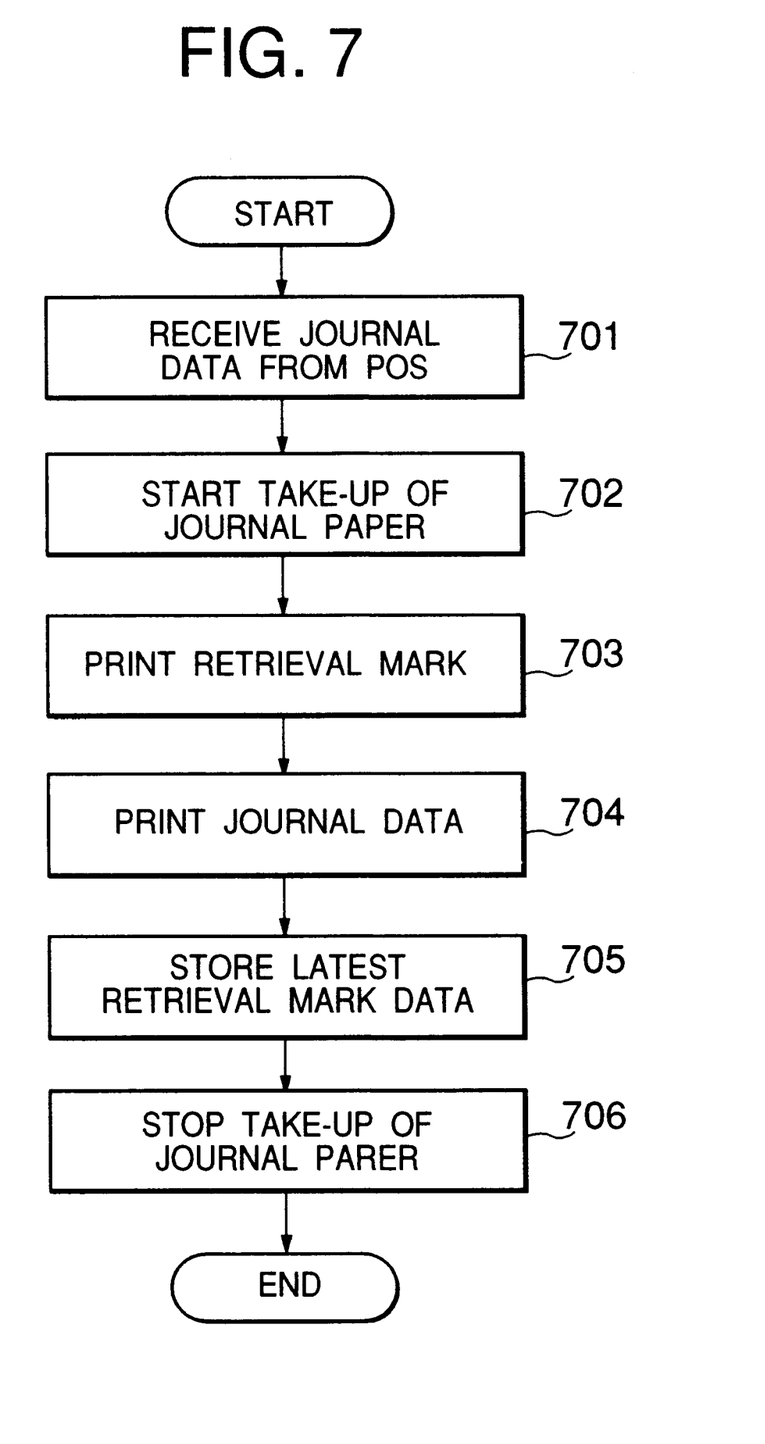
FIG. 7 is a flow chart showing operation of journal data printing processing according to the present embodiment which is to be conducted to obtain the printing result illustrated in FIG. 6.

FIG. 7 is a flow chart showing operation of the journal device 10 at the time of recording of the journal data 151 and the retrieval mark 152 as illustrated in FIG. 6. With reference to FIG. 7, the operation is almost the same as the operation shown in the flow chart of FIG. 4, with only the difference being that the printing unit 80 prints the journal data 151 after printing the retrieval mark 152 under the control of the printer driver 30 (Steps 703 and 704).

Figure 8:
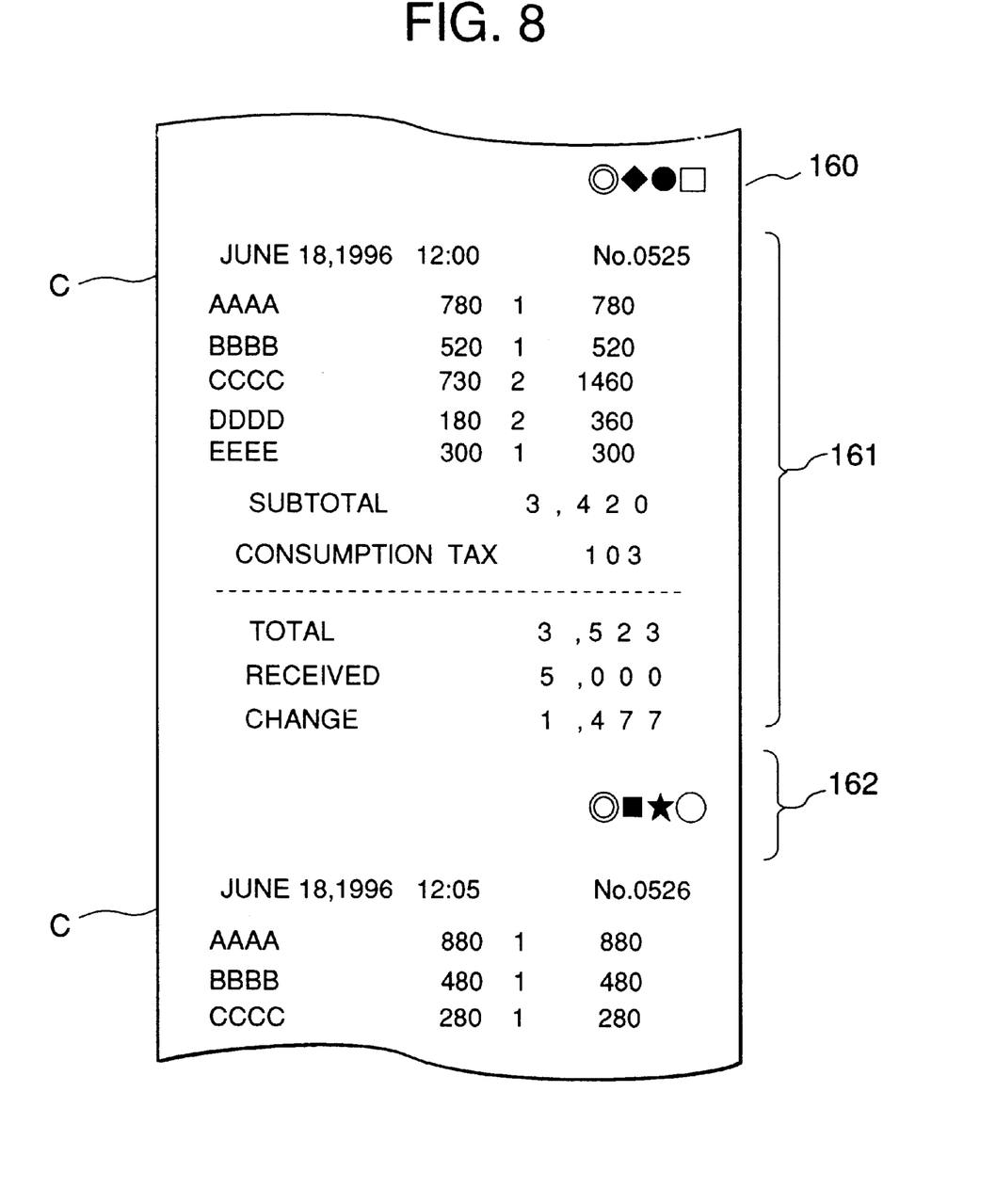
FIG. 8 is a diagram showing a further print example of journal data and a retrieval mark according to the present embodiment.

FIG. 8 is a diagram showing one example of a print result obtained when the retrieval mark 142 is recorded not as a bar code but as a specifically determined symbol.

With reference to the print result of FIG. 8, an area C—C on journal paper 160 represents data recorded corresponding to one transaction. As shown in the figure, the area C—C has a retrieval mark 162 printed below journal data 161. The retrieval mark 162 is formed by arranging, at a position specified according to a kind of information for retrieval, specific graphic symbols denoting the contents of the information. In the illustrated example, a series of four graphic symbols represents four kinds of data from the left, selling price, processing section, time of sale, and day of the week of sale.

Since using symbols as the retrieval mark 162 needs less area for printing the retrieval mark 162 than that required for printing a bar code, the amount of the journal paper 160 to be used can be reduced to achieve economical use. Operation at the recording of the journal data 161 and the retrieval mark 162 and operation at the retrieval are the same as those shown in the flow charts of FIGS. 4 and 5.

In the foregoing, while the description has been made of the journal device 10 of the present embodiment which is formed by a simple unit, journal devices, in practical use at an ECR or a POS terminal, are not used as a simple unit but together with a receipt device (receipt printer) in most cases. The journal device of the present invention can be therefore used not only as a simple unit but also as a receipt/journal device with a receipt device mounted thereon.

Receipt devices are devices having a function of printing purchase contents on receipt paper and cutting the printed receipt paper for the purpose of handing a customer paper on which purchase contents are printed. Mounting a receipt device on the journal device 10 of the present embodiment enables the journal device to be applied to various ECRs and POS terminals to improve versatility.

As described in the foregoing, the journal device of the present invention enables quick retrieval of target journal data among numerous journal data printed on journal paper by printing, at the time of printing of journal data on journal paper, a retrieval mark indicative of information specifying the journal data at the same time and at the time of retrieval of journal data, designating information to be specified by the retrieval mark to conduct retrieval, thereby improving efficiency of retrieval processing.

In addition, taking up journal paper by two take-up means each having driving means enables the journal paper to run in two directions, the direction from one take-up means to the other and its opposite direction. When retrieving journal data recorded on journal paper in use, the journal device is allowed to directly proceed to retrieval processing without resetting the journal paper on the take-up means, whereby labor required for proceeding to the processing can be reduced.

Furthermore, since by storing information represented by a retrieval mark corresponding to latest journal data in the journal device, it is possible after the completion of the retrieval of journal data to rewind the journal paper while collating with a retrieval mark to quickly return to a recording position of the journal data recorded last, labor required for proceeding to journal data recording processing can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A journal device for printing data accompanying product sales on journal paper, comprising:

a printing unit for printing journal data on the journal paper, as well as printing a retrieval mark indicative of information specifying the journal data;

an operation unit for specifying journal data to be retrieved among the journal data printed on the journal paper and for designating information represented by the retrieval mark;

a reading unit for reading the retrieval mark printed on the journal paper to extract information represented by the read retrieval mark;

a printer control unit for receiving input of information extracted by said reading unit and for collating the information with information designated by said operation unit to retrieve a retrieval mark containing target information; and a journal paper running unit, controlled by the printer control unit, for running the journal paper for printing processing of journal data and the retrieval mark by said printing unit and for reading processing of the retrieval mark by said reading unit, said journal paper running unit including a first journal paper take-up unit and a second journal paper take-up unit, each having a driving mechanism, said journal paper running unit adapted to run the journal paper in a forward direction from said first take-up unit to said second take-up unit and in a backward direction from said second take-up unit to said first take-up unit, wherein, when retrieving the journal data recorded on the journal paper in use, said printer control unit controls said journal paper running unit to run the journal paper in the backward direction, and wherein when the device proceeds from retrieving the journal data to printing processing, said printer control unit, by storing information represented by the retrieval mark corresponding to the journal data recorded last and by collating information extracted by said reading unit with said stored information, controls said journal paper running unit to run the journal paper up to a recording position of the journal data recorded last.

2. The journal device as set forth in claim 1, wherein the retrieval mark is a bar code representing a sequence of numbers indicative of information specifying the journal data.

3. The journal device as set forth in claim 1, wherein the retrieval mark is a series of symbols in which specific symbols denoting the contents of the information are disposed at a position specified by each kind of information specifying the journal data.

4. The journal device as set forth in claim 1, wherein after printing the journal data, said printing unit prints the retrieval mark corresponding to the printed journal data below the printing position of the journal data.

5. The journal device as set forth in claim 1, wherein before printing the journal data, said printing unit prints the retrieval mark corresponding to journal data to be printed above the printing position of the journal data.

6. The journal device as set forth in claim 1, further comprising:

communication unit to be connected with a host device which executes various processing accompanying product sales, wherein, besides said operation unit, communication from said host device specifies journal data to be retrieved among the journal data printed on the journal paper and designates information represented by the retrieval mark.

7. A journal device for printing data accompanying product sales on journal paper, comprising:

a printing unit for printing journal data on the journal paper, as well as printing a retrieval mark indicative of information specifying the journal data;

an operation unit for specifying journal data to be retrieved among the journal data printed on the journal paper and for designating information represented by the retrieval mark;

a reading unit for reading the retrieval mark printed on the journal paper to extract information represented by the read retrieval mark;

a printer control unit for receiving input of information extracted by said reading unit and for collating the information with information designated by said operation unit to retrieve a retrieval mark containing target information; and a journal paper running unit, controlled by the printer control unit, for running the journal paper for printing processing of journal data and the retrieval mark by said printing unit and for reading processing of the retrieval mark by said reading unit, wherein when the device proceeds from retrieving the journal data to printing processing, said printer control unit, by storing information represented by the retrieval mark corresponding to the journal data recorded last and by collating information extracted by said reading unit with said stored information, controls said journal paper running unit to run the journal paper up to a recording position of the journal data recorded last.

* * * * *